US005724854A

United States Patent [19]

Chen

[11] Patent Number: 5,724,854

[45] Date of Patent: Mar. 10, 1998

[54] TRANSMITTING DEVICE FOR AN AUTOMOBILE ELECTRIC WINDOW

[75] Inventor: Kun Chu Chen, Taipei, Taiwan

[73] Assignee: Ching-Yun Huang, Tainan Hsien, Taiwan

[21] Appl. No.: 645,829

[22] Filed: May 14, 1996

[51] Int. Cl.[6] .......... F16H 27/02

[52] U.S. Cl. .......... 74/89.21; 74/506; 474/140; 474/145; 474/147

[58] Field of Search .......... 74/89.21, 89.22, 74/505, 506, 501.5 R, 500.5, 502.3; 474/140, 144, 145, 146, 147

[56] References Cited

U.S. PATENT DOCUMENTS

| | | | |
|---|---|---|---|
| 4,628,759 | 12/1986 | Kobayashi et al. | 74/505 |
| 4,907,465 | 3/1990 | Machida et al. | 74/506 |
| 5,129,281 | 7/1992 | Van Zanten et al. | 74/506 |
| 5,301,563 | 4/1994 | Van Zanten et al. | 74/506 |
| 5,440,944 | 8/1995 | Chen | 74/89.21 |
| 5,615,577 | 4/1997 | Chen | 74/89.21 |

*Primary Examiner*—Khoi Q. Ta
*Assistant Examiner*—David M. Fenstermacher

[57] ABSTRACT

A transmitting device for an automobile electric window consists of a housing, a motor, a worm gear, a cap, an elastic shaft connector, a lower chain protector, and an upper chain protector combined together. The motor has a worm on its shaft to rotate the worm gear placed in the housing, and the worm gear is connected with the elastic shaft connector connected with a leaf shaft of the lower chain protector. An endless chain extends around the leaf shaft and a gear in the upper chain protector, which is rotated by the chain through the motor, the worm gear, the elastic shaft connector, the leaf shafts so as to lower and lift an electric window of an automobile.

1 Claim, 6 Drawing Sheets

TRANSMITTING DEVICE FOR AN AUTOMOBILE ELECTRIC WINDOW

BACKGROUND OF THE INVENTION

This invention concerns a transmitting device for an automobile electric window, particularly able to securing up and down movement of an automobile electric window and adaptable to various automobile electric windows.

A known conventional transmitting device for an automobile electric window shown in FIG. 1 includes a worm gear housing 10, a worm gear 11, a worm 12, a motor 13, a shaft base 14, a rear cap 15, a front cap 16, an elastic shaft connector 17, a lower chain protector 18, and an upper chain protector 182 as main components combined together.

The worm gear housing 10 has a center cavity 100, an annular projection 101 on an inner surface, a base 102 formed on the housing 10, and a through hole 103 in the case 102 for the worm 12 to extend therein.

The worm gear 11 is fitted in the cavity 100 of the worm gear housing 10, having a recess 110 in a left side for the annular projection 101 to fit therein, a leaf shaft 111 formed on a right side and having plural leaves 1110 and a center hole 112.

The worm 12 extends in the through hole 103 of the base 102, engaging with the worm gear 11, having an end connected with and rotated by the motor 13.

The shaft base 14 has a shaft 140 extending lengthwise from the center, located behind the worm gear housing 10, with the shaft 140 fitting in a shaft hole 112 of the worm gear 11.

The rear cap 15 closes on a rear side of the shaft base 14.

The front cap 16 closes on an open front side of the worm gear housing 10, having a center hole 160.

The elastic shaft connector 17 is combined with the leaf shaft 111 of the worm gear 11, having the same number of slots 170 as that of the leaves 1110 in a front side cut radially and equidistantly.

The main chain protector 18 is combined with a front side of the front cap 16, having a leaf shaft 180 formed in a rear side. The leaf shaft 180 has the same number of leaves set radially and equidistantly as that of the slots 170 of the elastic shaft connector 17. Further, two parallel flexible tubes 181, 181 are respectively connected with two opposite ends of an upper side of the chain protector 18, and an endless chain is provided to extend in the two tubes 181, 181. Upper ends of the two tubes 181, 181 is connected with an upper chain protector 182 having a gear 1820 in its center.

However, the known conventional transmitting device for an automobile electric window has drawbacks of too many components, of troublesome assemblage, and of rather high cost. In addition, the shaft base 14 is not so stable, fitted in the worm gear housing 10, easily being, vibrated during operation of the motor 14 and therefore liable to loosen after a long period of use. Besides, the two flexible tubes 181, 181 are separated for a comparatively long distance so that they form different angles when bent. Therefore, the chain may not move smoothly, causing incomplete engagement with the gear, sliding off the gear, or quick wear and tear of the gear, resulting in unstable opening or closing of the electric window.

SUMMARY OF THE INVENTION

The main purpose of the invention is to offer a transmitting device for an automobile electric window, able to lower and lift the window with steady and stable movement, and having a simple structure for fast assemblage to lower the cost.

The main feature of the invention is a housing formed integral and having a lengthwise shaft extending in its interior cavity to fit in a recess formed in a left side of a worm gear, and a lower chain protector having a chain groove with a neck connected with two flexible tubes adhered side by side, and an upper chain protector having a chain groove with a neck connected with the two flexible tubes. Then a protective cover wraps the two flexible tubes.

BRIEF DESCRIPTION OF DRAWINGS

This invention will be better understood by reference to the accompanying drawings, wherein.

DESCRIPTION OF THE PREFERRED EMBODIMENT

Figure 1:
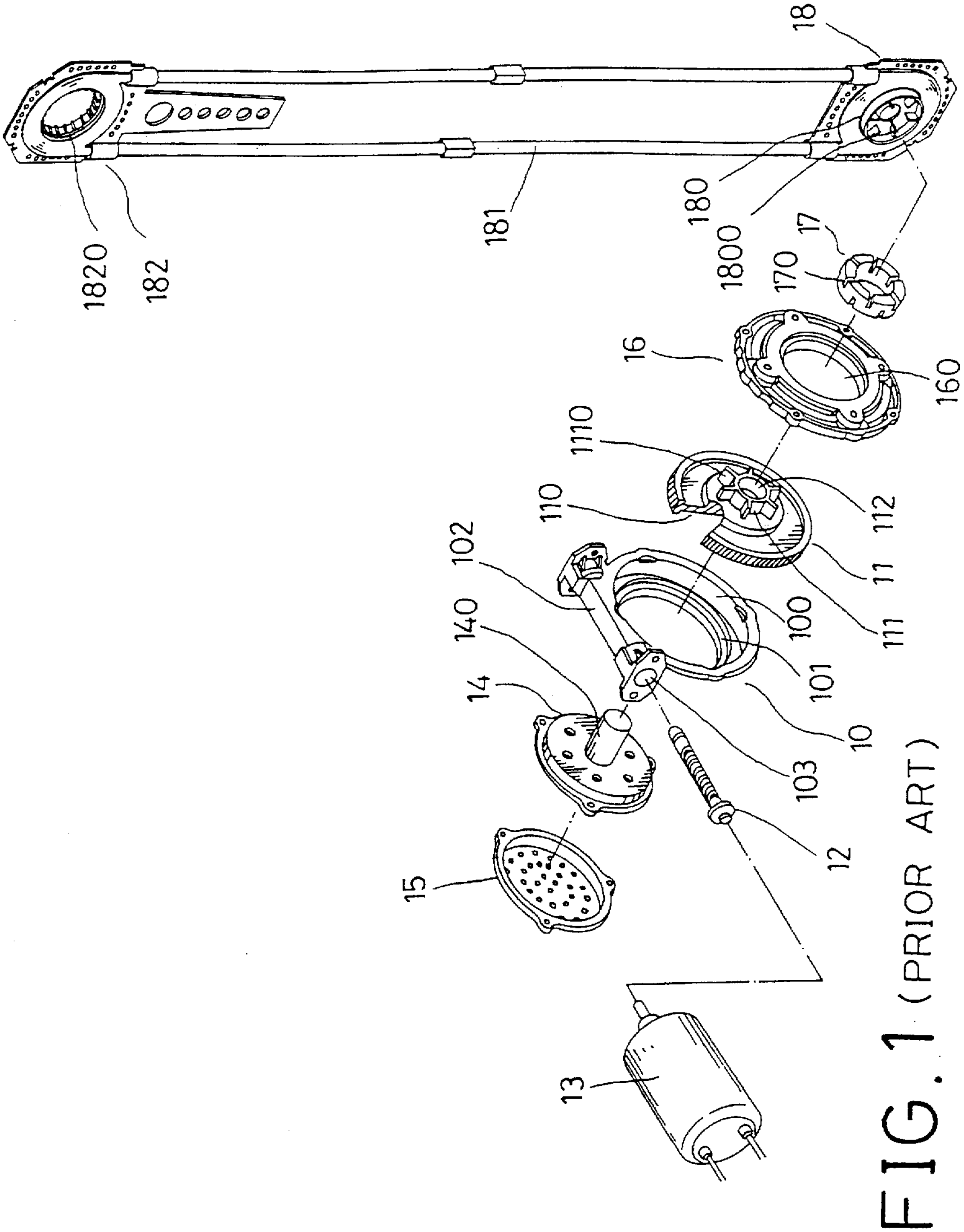
FIG. 1 (PRIOR ART)
FIG. 1 is an exploded perspective view of a known conventional transmitting device for an automobile electric window.
Figure 2:
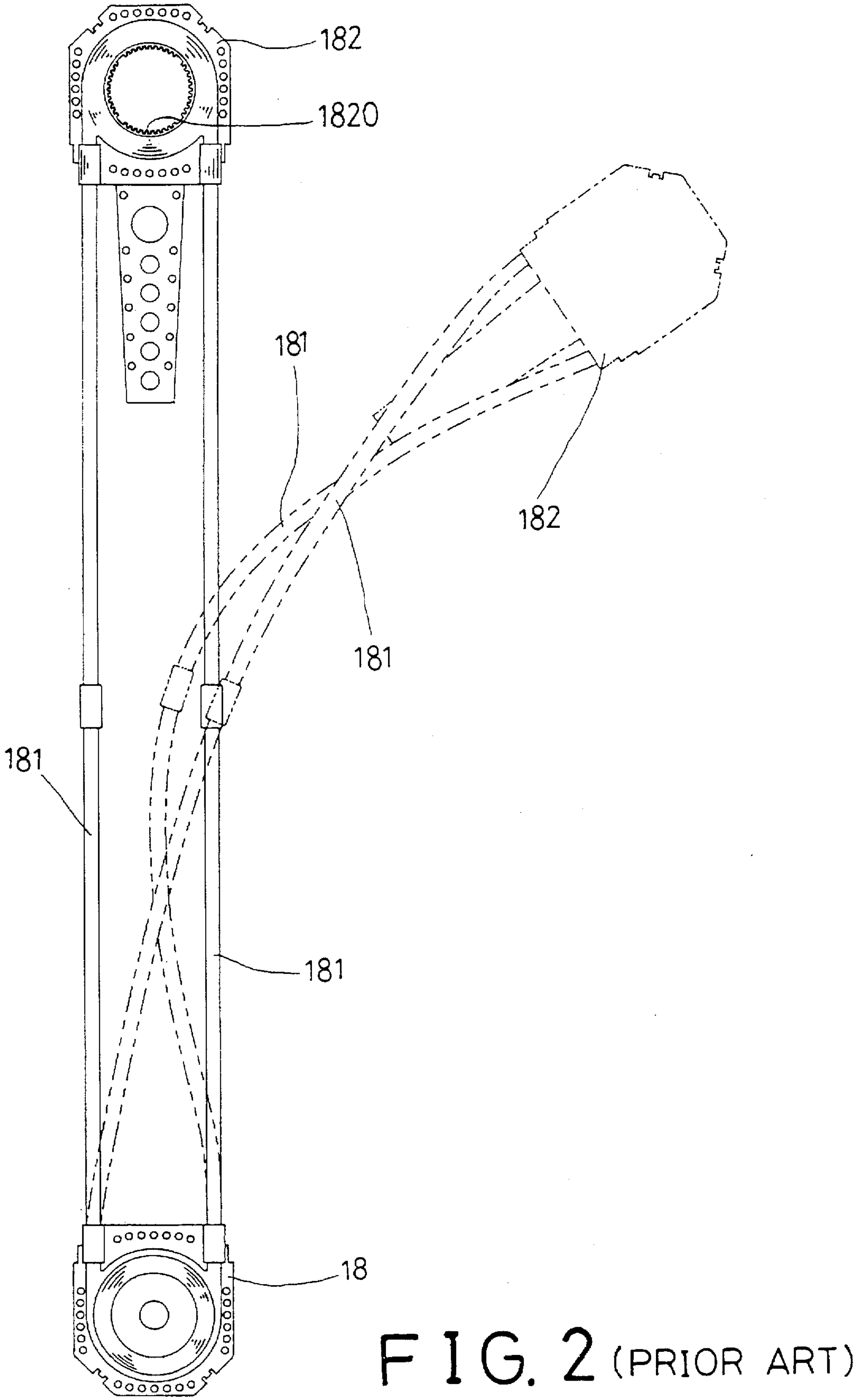
FIG. 2 (PRIOR ART)
FIG. 2 is a side view of the known conventional transmitting device for an automobile electric window, showing it being in use.
Figure 3:
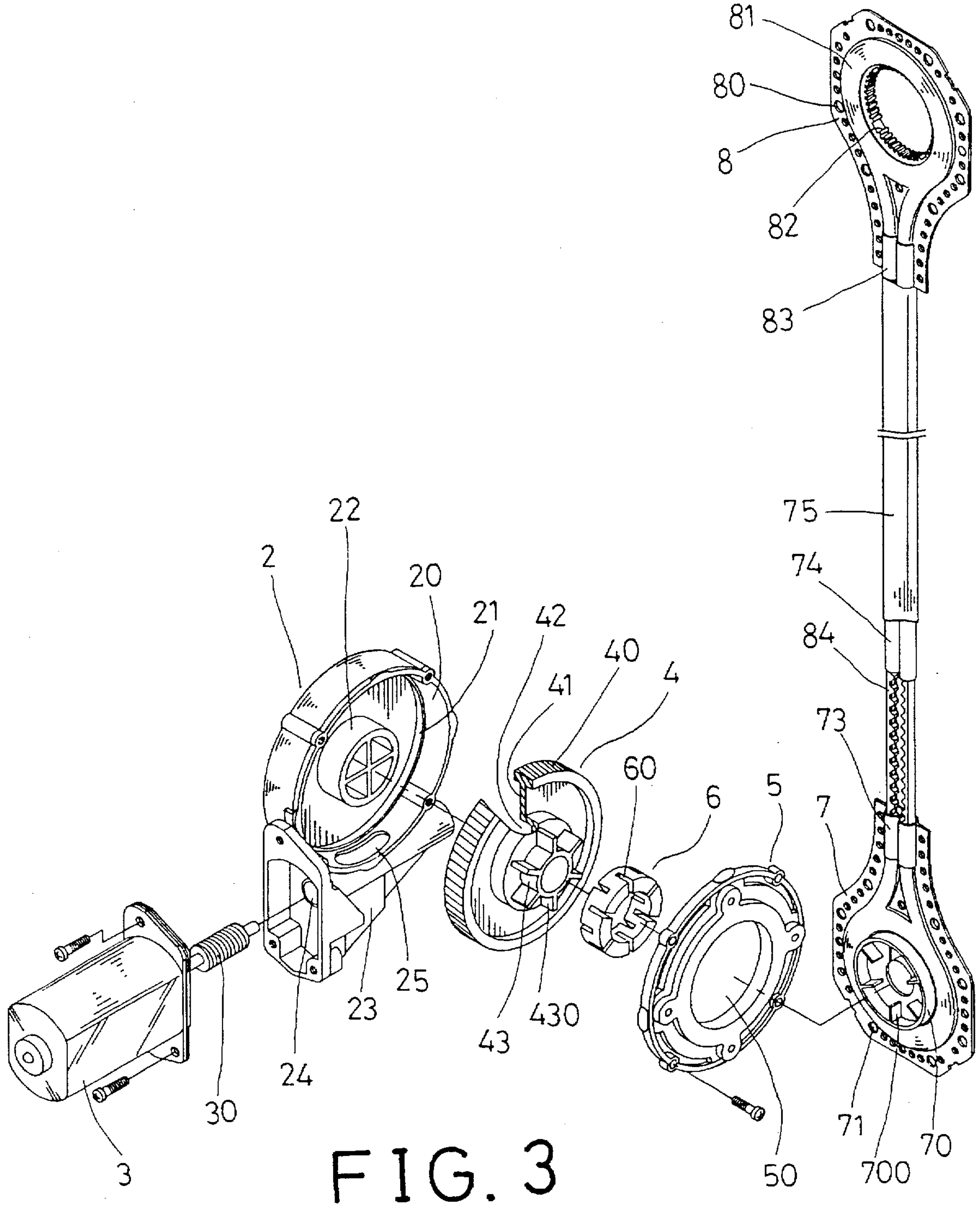
FIG. 3 is an exploded perspective view of a transmitting device for an automobile electric window in the present invention.

A preferred embodiment of a transmitting device for an automobile electric window in the present invention, as shown in FIG. 3, includes a housing 2, a motor 3, a worm gear 4, a cap 5, an elastic shaft connector 6, a lower chain protector 7, and an upper chain protector 8 as main components combined together.

The housing 2 is shaped cylindrical, having a closed left side, an open right side, an interior cavity 20, an annular short wall 21 projecting on an inner peripheral surface, a projecting shaft 22 extending lengthwise from the center of the closed left side. A motor base 23 is formed under the housing 2, having a chamber 24 formed at a front side, and a slot 25 provided to communicate the chamber 24 with the interior cavity 20.

The motor 3 is mounted on the base 23, having a worm 30 on its shaft extending to the rear side and in the chamber 24 with a small upper part thereof protruding in the interior cavity 20.

The worm gear 4 is deposited in the interior cavity 20 of the housing 2, having continual teeth 40 on its periphery in engaging condition with the worm 30, a first recess 41 on a left side, a second deeper recess 42 in the center portion of the first recess 41, a leaf shaft 43 with plural leaves 430 formed extending radially and equidistantly on the center of a right side.

The cap 5 closes on the open right side of the housing 2, securing the worm gear 4 in the interior cavity 20, having a center hole 50.

The elastic shaft connector 6 engages with the leaf shaft 43 of the worm gear 4, having the same number of slots 60 cut radially and equidistantly and respectively in a left side and in a right side as that of the leaves 430.

The lower chain protector 7 is located at the right side of the cap 5, having a shape similar to a tennis racket, a leaf shaft 70 with the same number of plural leaves 700 extending radially and equidistantly on a left side as that of the slots 60, a plurality of round holes 71 around its peripheral edge, a chain groove 72 of a shape with a neck 73 at its upper end, two flexible tubes 74 adhered side by side and connected with the neck 73, and a protective cover 75 wrapping the flexible tubes 74, 74. The leaf shaft 70 is connected with the elastic shaft connector 6 in an engaged condition.

The upper chain protector 8 is located at an upper end of the flexible tubes 74, 74, having a shape similar to a tennis racket shape, a plurality of round holes 80 around its periphery, a chain groove 81 of a shape with a neck 83 at its lower end, and a gear 82 in a center.

Further, an endless transmitting chain 84 is provided to extend around the leaf shaft 70 of the lower chain protector 7, the gear 81 of the upper chain protector 8 and through the chain grooves 72 and 81 of the two chain protectors 7 and 8 and through the two flexible tubes 74.

Figure 4:
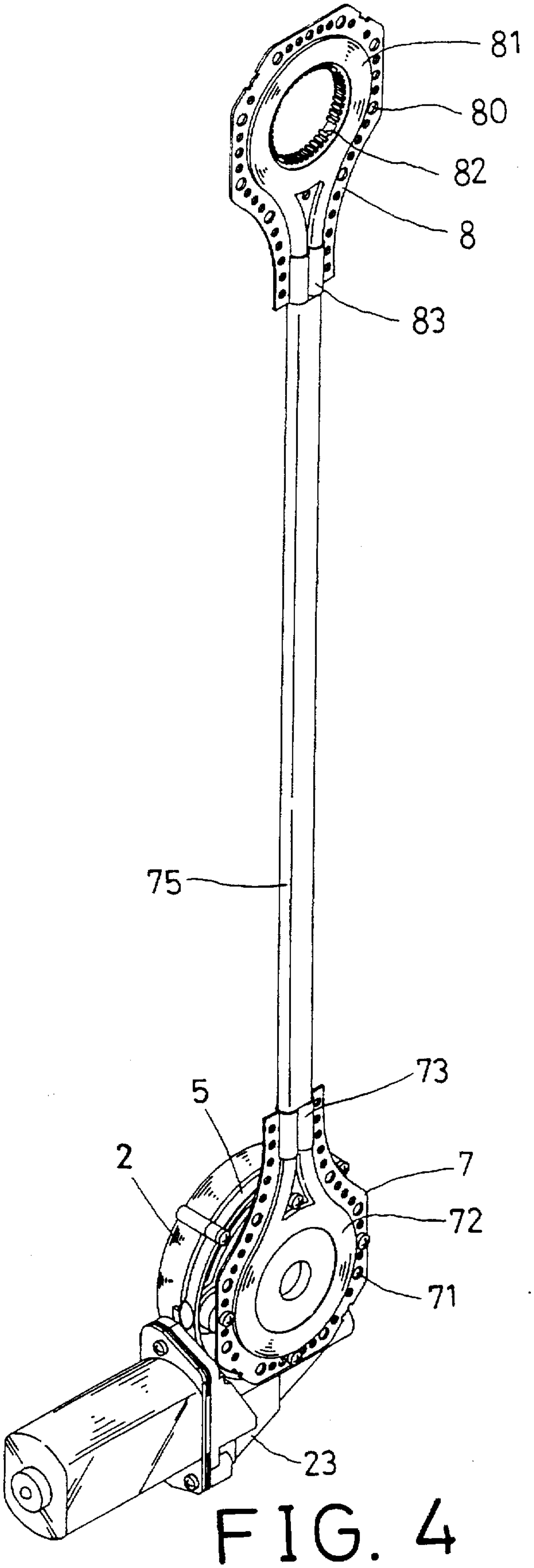
FIG. 4 is a perspective view of the transmitting device for an automobile electric window in the present invention.
Figure 5:
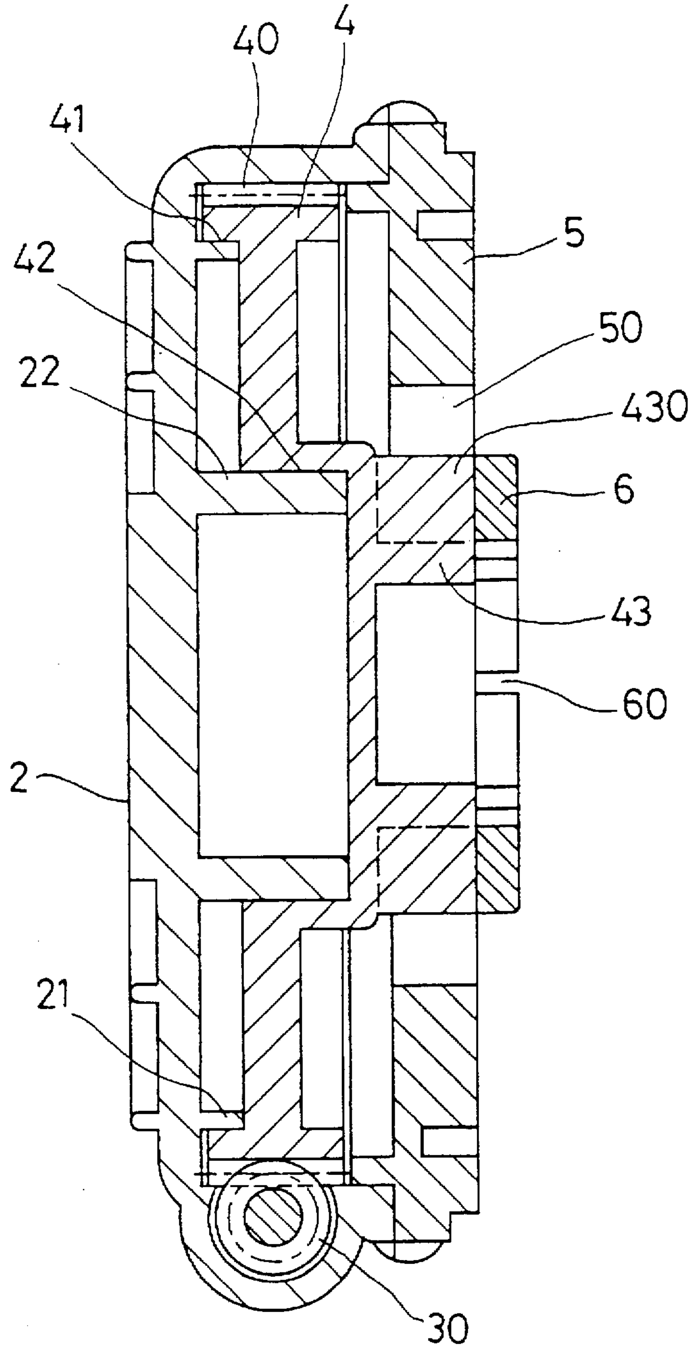
FIG. 5 is a cross-sectional view of a partial combination of the transmitting device for an automobile electric window in the present invention; and, FIG. 6 is a side view of the transmitting device for an automobile electric window in the present invention, showing it being in use.

In assembling, referring to FIGS. 4 and 5, firstly, the worm 30 of the motor 3 is placed in the chamber 24, with the motor 3 screwed tightly on the base 23. Then the worm gear 4 is deposited in the interior cavity 20 of the housing 2, with some teeth 40 thereof engaging with the worm 30, and with the first recess 41 and the second recess 42 respectively engaging with the annular wall 21 and the projecting shaft 22 of the housing 2 so as to secure the worm gear 4 in place. Next, the cap 5 is closed tightly on the open right side of the housing 2 with screws, hiding the worm gear 4 in the interior cavity 20 of the housing 2. Then the elastic shaft connector 6 is made to engage the leaf shaft 43. Finally the lower chain protector 7, the upper chain protector 8, the flexible tubes 74, 74 and the chain 84 are combined together, and the leaf shaft 70 of the lower chain protector 7 is made to engage with the elastic shaft connector 6, with screws passing through the round holes and engaging the chain protector 7 with the cap 5 tightly. As the housing 2 is formed integral, facilitating assemblage, without screwing the shaft base 14 and the bottom cap 15 as in the known conventional one.

In using, the worm 30 rotated by the motor 3 rotates the worm gear 4, which then in turn rotates the leaf shaft 43 of itself. Then the elastic shaft connector 6 is rotated by the leaf shaft 43, rotating the leaf shaft 70 of the lower chain protector 7, which then in turn moves the transmitting chain 84 in the groove 72. The transmitting chain 84 rotates the gear 82 of the upper chain protector 8, which then lowers or lifts an electric window of an automobile.

Figure 6:
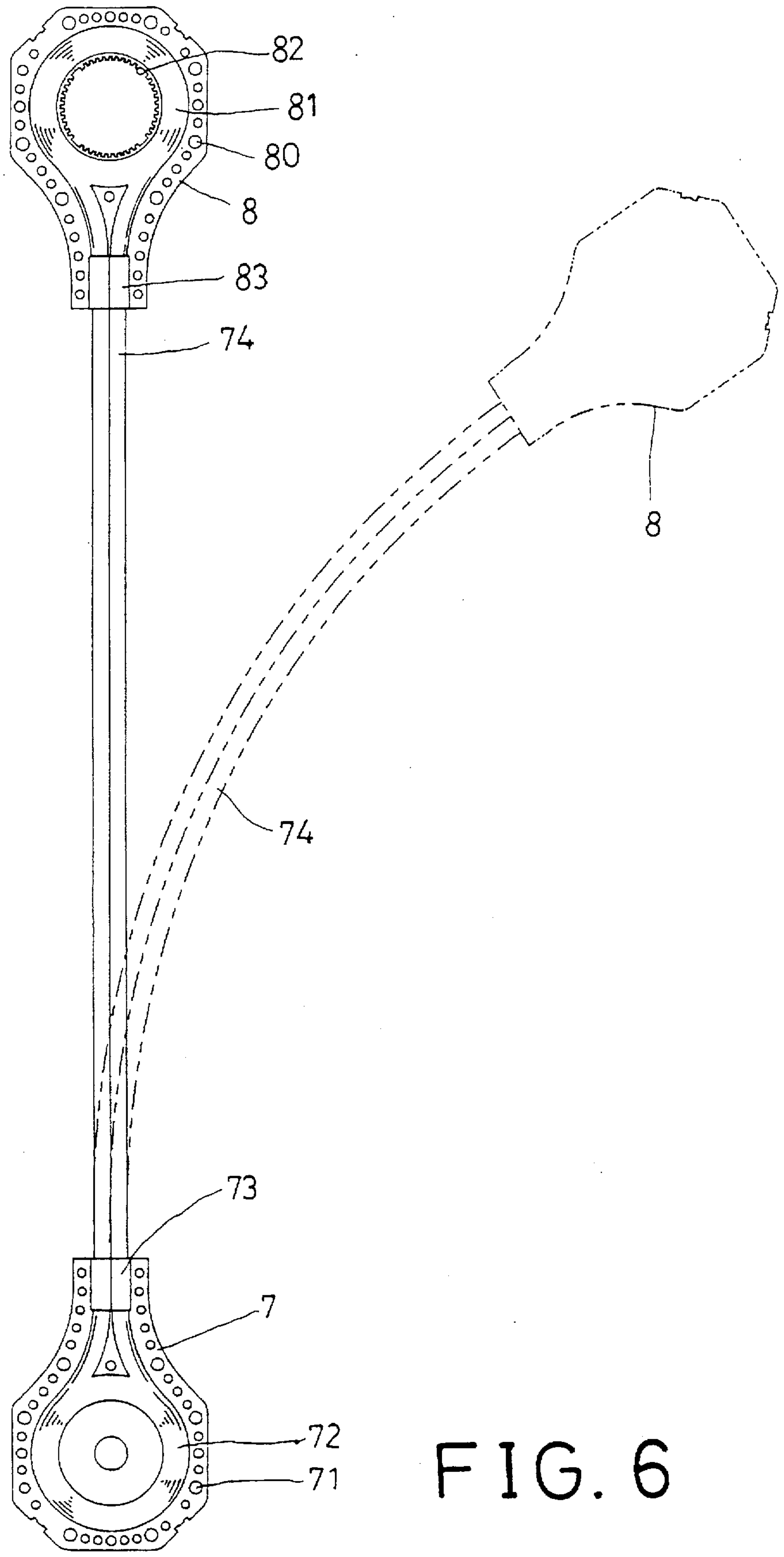

The two elastic tubes 74, 74 are designed to be located side by side, adaptable for electric windows of any shape in various automobiles. Referring to FIG. 6, the two elastic tubes 74, 74 may not be twisted against each other, as their winding angles are almost the same, not so large, and consequently the chain 84 may move smoothly, not sliding off teeth of the gear, or not tightly sticking with the gear.

As understood from the above description, this invention has the following advantages.

1. The two flexible tubes for the chain is adhered side by side, enabling the transmitting chain move around stably and smoothly, without possibility of sliding off teeth, of sticking with teeth, of unstable movement, increasing its service life.

2. Its structure is simple and convenient for assemblage, lowering cost.

While the preferred embodiment of the invention has been described above, it will be recognized and understood that various modifications may be made therein and the appended claims are intended to cover all such modifications which may fall within the spirit and scope of the invention.

What is claimed is:

1. A motion transmitting device in combination with an automobile electric window comprising:

a) a housing having a cylindrical configuration with an integral end wall closing one end of the cylindrical configuration and an opposite open end to form an interior cavity, an annular wall formed integrally with the end wall and extending into the interior cavity, and a projecting shaft formed integrally with the end wall and projecting into the interior cavity;

b) a motor base on the housing, the motor base communicating with the interior chamber through a slot in the housing;

c) a motor mounted on the motor base and having a worm fixed to a motor output shaft;

d) a worm gear rotatably mounted in the interior chamber and engaging the worm through the slot, the worm gear having a first side with a first recess accommodating the annular wall and a second recess, deeper than the first recess, accommodating the projecting shaft therein, the worm gear having a second side with a first leaf shaft extending centrally therefrom, the first leaf having a plurality of first leaves extending substantially radially therefrom;

e) a cap removably attached to the housing so as to extend over the open end of the cylindrical configuration, the cap having a central opening;

f) an elastic shaft connector attached to the first leaf shaft so as to rotate therewith and extending through central opening of the cap;

g) a lower chain protector attached to the cap and having a second leaf shaft with a plurality of second leaves extending substantially radially therefrom, the second leaf shaft connected with the elastic shaft connector, the lower chain protector having a lower chain groove around the second leaf shaft;

h) an upper chain protector forming an upper chain groove extending around an upper gear rotatably located in the upper chain protector;

i) a pair of flexible tubes located side by side and extending between the lower and upper chain protectors;

j) an endless chain extending in the lower chain groove, around the second leaf shaft, through a first of the pair of tubes, in the upper chain groove, around the upper gear and through a second of the pair of tubes; and, k) a protective cover wrapping a length of the pair of flexible tubes between the upper and lower chain protectors.

* * * * *